United States Patent
Grelet et al.

(10) Patent No.: US 11,118,482 B2
(45) Date of Patent: Sep. 14, 2021

(54) RANKINE POWER SYSTEM FOR USE WITH EXHAUST GAS AFTERTREATMENT SYSTEM

(71) Applicant: Tenneco GmbH, Edenkoben (DE)

(72) Inventors: Vincent Grelet, Landau in der Pfalz (DE); Pierre Tipner, Wissembourg (FR)

(73) Assignee: Tenneco GmbH, Edenkoben (DE)

( * ) Notice: Subject to any disclaimer, the term of this patent is extended or adjusted under 35 U.S.C. 154(b) by 96 days.

(21) Appl. No.: 16/784,343

(22) Filed: Feb. 7, 2020

(65) Prior Publication Data

US 2020/0173312 A1    Jun. 4, 2020

Related U.S. Application Data (62) Division of application No. 15/973,963, filed on May 8, 2018, now Pat. No. 10,570,784.

(Continued)

(51) Int. Cl.
*F01K 23/10* (2006.01)
*F01N 3/00* (2006.01)
(Continued)

(52) U.S. Cl.
CPC .......... *F01K 23/101* (2013.01); *B60K 13/04* (2013.01); *F01K 9/003* (2013.01); *F01K 13/02* (2013.01);
(Continued)

(58) Field of Classification Search
CPC ... B60K 13/04; B60Y 2200/142; F01K 13/02; F01K 15/02; F01K 23/065; F01K 23/10;
(Continued)

(56) References Cited

U.S. PATENT DOCUMENTS

| 3,512,358 A | 5/1970 | Schmidt |
| 6,910,333 B2 | 6/2005 | Minemi et al. |

(Continued)

FOREIGN PATENT DOCUMENTS

| AT | 507096 A4 | 2/2010 |
| DE | 102009028467 A1 | 2/2011 |

(Continued)

OTHER PUBLICATIONS

Horst, Tilmann Abbe: "Betrieb eines rankine—prozesses zur abgaswärmenutzung im pkw", Jan. 1, 2015 (Jan. 1, 2015), XP055518930, Retrieved from the Internet: URL:http://ift-bs.de/images/Dokumente/horst_diss.pdf, (pp. 33-54) (pp. 55-58) (pp. 8, 34, pp. 55-59).

(Continued)

*Primary Examiner* — Jesse S Bogue
(74) *Attorney, Agent, or Firm* — Harness, Dickey & Pierce, PL.C.

(57) ABSTRACT

A power system for converting waste heat from exhaust gases of an internal combustion engine to electrical energy includes an aftertreatment assembly positioned within a first housing. The power system includes an evaporator assembly positioned within a second housing. The evaporator assembly is positioned directly adjacent the aftertreatment assembly. The evaporator assembly includes a first portion of a working fluid loop in thermal communication with a first length of an exhaust conduit that extends from the aftertreatment assembly into the second housing. The power system includes a power pack positioned longitudinally forward of the aftertreatment assembly. The power pack includes a tank, a condenser, a pump and an expander fluidly connected by a second portion of the working fluid loop. The second portion is fluidly connected to the first portion of the working fluid loop.

15 Claims, 6 Drawing Sheets

Related U.S. Application Data (60) Provisional application No. 62/562,017, filed on Sep. 22, 2017.

(51) Int. Cl.

| | | |
|---|---|---|
| F01P 3/12 | (2006.01) | |
| F01K 13/02 | (2006.01) | |
| F01P 3/20 | (2006.01) | |
| F01K 9/00 | (2006.01) | |
| F01N 13/00 | (2010.01) | |
| B60K 13/04 | (2006.01) | |
| F01K 23/06 | (2006.01) | |
| F01N 3/04 | (2006.01) | |
| F01N 5/02 | (2006.01) | |
| F01N 5/04 | (2006.01) | |
| F01P 5/10 | (2006.01) | |
| F01P 7/16 | (2006.01) | |
| F01P 11/16 | (2006.01) | |
| F01P 11/18 | (2006.01) | |
| F02G 5/02 | (2006.01) | |
| F01N 3/021 | (2006.01) | |
| F01N 3/08 | (2006.01) | |
| F01N 3/035 | (2006.01) | |
| F01N 3/10 | (2006.01) | |
| F01N 9/00 | (2006.01) | |
| F01N 3/20 | (2006.01) | |
| F01P 7/14 | (2006.01) | |
| F01K 15/02 | (2006.01) | |

(52) U.S. Cl.
CPC ............ F01K 23/065 (2013.01); F01K 23/10 (2013.01); F01N 3/005 (2013.01); F01N 3/043 (2013.01); F01N 5/02 (2013.01); F01N 5/04 (2013.01); F01N 13/00 (2013.01); F01P 3/12 (2013.01); F01P 3/20 (2013.01); F01P 5/10 (2013.01); F01P 7/161 (2013.01); F01P 11/16 (2013.01); F01P 11/18 (2013.01); F02G 5/02 (2013.01); B60Y 2200/142 (2013.01); F01K 15/02 (2013.01); F01N 3/021 (2013.01); F01N 3/035 (2013.01); F01N 3/0814 (2013.01); F01N 3/0842 (2013.01); F01N 3/0857 (2013.01); F01N 3/101 (2013.01); F01N 3/103 (2013.01); F01N 3/106 (2013.01); F01N 3/2066 (2013.01); F01N 9/00 (2013.01); F01N 13/009 (2014.06); F01N 2240/02 (2013.01); F01P 2007/146 (2013.01); F01P 2025/08 (2013.01); F01P 2060/14 (2013.01); F02G 2254/15 (2013.01); F02G 2280/50 (2013.01)

(58) Field of Classification Search
CPC ........ F01K 23/101; F01K 9/003; F01N 13/00; F01N 13/009; F01N 2240/02; F01N 3/005; F01N 3/021; F01N 3/035; F01N 3/043; F01N 3/0814; F01N 3/0842; F01N 3/0857; F01N 3/101; F01N 3/103; F01N 3/106; F01N 3/2066; F01N 5/02; F01N 5/04; F01N 9/00; F01P 11/16; F01P 11/18; F01P 2007/146; F01P 2025/08; F01P 2060/14; F01P 3/12; F01P 3/20; F01P 5/10; F01P 7/161; F02G 2254/15; F02G 2280/50; F02G 5/02; Y02A 50/20; Y02E 20/30; Y02T 10/12
See application file for complete search history.

(56) References Cited

U.S. PATENT DOCUMENTS

| | | |
|---|---|---|
| 7,159,400 B2 * | 1/2007 | Tsutsui ............... F01K 9/00 60/665 |
| 7,174,732 B2 * | 2/2007 | Taniguchi ............ B01D 5/0093 60/514 |
| 7,454,910 B2 | 11/2008 | Hamada et al. |
| 7,475,541 B2 | 1/2009 | Ibaraki et al. |
| 8,707,688 B2 * | 4/2014 | Raab ................... F01N 1/08 60/320 |
| 8,752,378 B2 | 6/2014 | Ernst et al. |
| 8,985,066 B2 | 3/2015 | Lutz et al. |
| 9,334,760 B2 | 5/2016 | Ernst et al. |
| 9,494,055 B2 | 11/2016 | Rusche |
| 9,587,521 B2 | 3/2017 | Eybergen |
| 9,587,546 B2 | 3/2017 | Hussain et al. |
| 9,745,869 B2 | 8/2017 | Ernst et al. |
| 9,784,139 B2 | 10/2017 | Shaffer et al. |
| 10,240,488 B2 | 3/2019 | Irmler et al. |
| 10,316,726 B2 | 6/2019 | Jerges et al. |
| 2002/0007636 A1 * | 1/2002 | Hay .................. F01K 25/08 60/618 |
| 2005/0072170 A1 * | 4/2005 | Taniguchi ............ F01K 23/065 62/183 |
| 2010/0037838 A1 | 2/2010 | Moench et al. |
| 2010/0156111 A1 * | 6/2010 | Pesce ................ F01K 23/065 290/1 A |
| 2011/0167818 A1 | 7/2011 | Tsuchino et al. |
| 2012/0159951 A1 | 6/2012 | Avery et al. |
| 2012/0198840 A1 * | 8/2012 | Stegmaier ............... F02G 5/02 60/605.1 |
| 2013/0199178 A1 | 8/2013 | Kanou et al. |
| 2013/0327041 A1 | 12/2013 | Gaertner et al. |
| 2015/0068208 A1 * | 3/2015 | Kosuda ............... F01K 11/00 60/690 |
| 2015/0121866 A1 | 5/2015 | Xia |
| 2015/0135708 A1 | 5/2015 | Lutz et al. |
| 2016/0017973 A1 * | 1/2016 | Steidten ............... F16H 13/06 475/33 |
| 2016/0186616 A1 | 6/2016 | Matsumoto et al. |
| 2016/0201519 A1 * | 7/2016 | Zhou ................... F01K 23/101 60/618 |
| 2016/0326981 A1 * | 11/2016 | Kolb .................. F01K 25/08 |
| 2017/0067372 A1 * | 3/2017 | Irmler ................ F01N 13/1844 |
| 2018/0114890 A1 | 4/2018 | Chauvin |
| 2019/0128147 A1 | 5/2019 | Liu et al. |

FOREIGN PATENT DOCUMENTS

| | | |
|---|---|---|
| DE | 102009050068 A1 | 4/2011 |
| DE | 102012209808 A1 | 12/2013 |
| DE | 102012209811 A1 | 12/2013 |
| DE | 102012209813 A1 | 12/2013 |
| DE | 102013021578 A1 | 7/2014 |
| DE | 102013211875 A1 | 1/2015 |
| DE | 102013222511 A1 | 5/2015 |
| DE | 102016012528 A1 | 4/2017 |
| DE | 102015224416 A1 | 6/2017 |
| EP | 2824300 A1 | 1/2015 |
| EP | 2933444 A1 | 10/2015 |
| EP | 3026246 A1 | 6/2016 |
| EP | 3098399 A1 | 11/2016 |
| JP | 2014190276 A | 10/2014 |
| WO | WO-2014064484 A1 | 5/2014 |
| WO | WO-2016155705 A1 | 10/2016 |
| WO | WO-2017123132 A1 | 7/2017 |

OTHER PUBLICATIONS

International Search Report and Written Opinion, dated Nov. 23, 2018, corresponding to PCT/IB2018/056607, ISA/EPO.
International Search Report, dated Nov. 23, 2018, corresponding to PCT/IB2018/056603, ISA/EPO.

(56) References Cited

OTHER PUBLICATIONS

International Search Report, dated Nov. 26, 2018, corresponding to PCT/IB2018/056608, ISA/EPO.

* cited by examiner

RANKINE POWER SYSTEM FOR USE WITH EXHAUST GAS AFTERTREATMENT SYSTEM

CROSS-REFERENCE TO RELATED APPLICATIONS

This application is a divisional of U.S. patent application Ser. No. 15/973,963, filed on May 8, 2018, which application claims the benefit of U.S. Provisional Application No. 62/562,017 filed on Sep. 22, 2017. The entire disclosures of the above applications are incorporated herein by reference.

FIELD

The present disclosure relates to a system that converts energy in form of heat within an exhaust system of an internal combustion engine to a more useful form of energy using the principles of a Rankine cycle.

BACKGROUND

This section provides background information related to the present disclosure and is not necessarily prior art.

Internal combustion engines often include an exhaust system that expels and treats the gases produced during the controlled combustion inside the engine. The gases that are produced during the controlled combustion are expelled at elevated temperatures. The energy associated with these heated gases is often transferred to the atmosphere resulting in inefficiencies in the internal combustion engine.

While diesel engines are known for being somewhat more efficient than other types of internal combustion engines, diesel engines also suffer from large inefficiencies that result from the expulsion of exhaust gases at elevated temperatures. The exhaust systems that are used in connection with diesel internal combustion engines often include aftertreatment systems that can contain a catalyst, a particulate filter and a deNox device to treat the gases expelled from the diesel internal combustion engine. After the expelled gases are treated, the gases remain at elevated temperatures. Instead of wasting the energy associated with the exhaust gases, the principles of the aforementioned Rankine cycle can be utilized to recover energy that can be used by various systems in the vehicle.

Known systems that attempt to recapture the energy associated with exhaust gases suffer from several disadvantages. Known systems are often bulky, complex and are difficult to integrate into existing vehicle systems. Known systems are also expensive, inefficient and difficult to service and maintain.

SUMMARY

This section provides a general summary of the disclosure, and is not a comprehensive disclosure of its full scope or all of its features.

In an aspect of the present disclosure, a power system for converting waste heat from exhaust gases of an internal combustion engine to electrical energy is provided. The power system includes an aftertreatment assembly positioned within a first housing. The aftertreatment assembly includes an exhaust conduit operable to receive exhaust gases from the internal combustion engine. The power system also includes an evaporator assembly positioned within a second housing. The evaporator assembly is positioned directly adjacent the aftertreatment assembly. The evaporator assembly includes a first portion of a working fluid loop. The first portion of the working fluid loop is in thermal communication with a first length of the exhaust conduit that extends from the aftertreatment assembly into the second housing. The power system also includes a power pack positioned inside a third housing. The power pack is positioned directly adjacent the evaporator assembly opposite to the aftertreatment assembly. The power pack includes a tank, a condenser, a pump and an expander fluidly connected by a second portion of the working fluid loop. The second portion is fluidly connected to the first portion of the working fluid loop.

In another aspect of the present disclosure, a power system for converting waste heat from exhaust gases of an internal combustion engine to electrical energy is provided. The power system includes an aftertreatment assembly including an exhaust conduit operable to receive exhaust gases from the internal combustion engine. The power system also includes an evaporator assembly positioned adjacent the aftertreatment assembly. The evaporator assembly includes a first portion of a working fluid loop. The first portion of the working fluid loop can be in thermal communication with the exhaust conduit that extends from the aftertreatment assembly into the evaporator assembly. The power system also includes a power pack positioned adjacent the aftertreatment assembly. The power pack includes a tank, a condenser, a pump and an expander fluidly connected by a second portion of the working fluid loop. The second portion fluidly connected to the first portion of the working fluid loop. The power pack defines a cavity through which the exhaust conduit extends from the engine to the aftertreatment assembly.

In another aspect of the present disclosure, a power system for converting waste heat from exhaust gases of an internal combustion engine to electrical energy is provided. The power system includes an aftertreatment assembly including an exhaust conduit operable to receive exhaust gases from the internal combustion engine. The aftertreatment assembly extends in a longitudinal direction away from the engine. The power system also includes an evaporator assembly positioned adjacent the aftertreatment assembly. The evaporator assembly includes a first portion of a working fluid loop. The first portion of the working fluid loop can be in thermal communication with the exhaust conduit that extends from the aftertreatment assembly into the evaporator assembly. The power system also includes a power pack positioned adjacent the aftertreatment assembly. The power pack includes a tank, a condenser, a pump and an expander fluidly connected by a second portion of the working fluid loop. The second portion is fluidly connected to the first portion of the working fluid loop and at least a portion of the power pack overlaps a longitudinal side of the aftertreatment assembly.

Other advantages and objects of the present disclosure will become apparent to those skilled in the art from the subsequent detailed description, appended claims and drawings. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
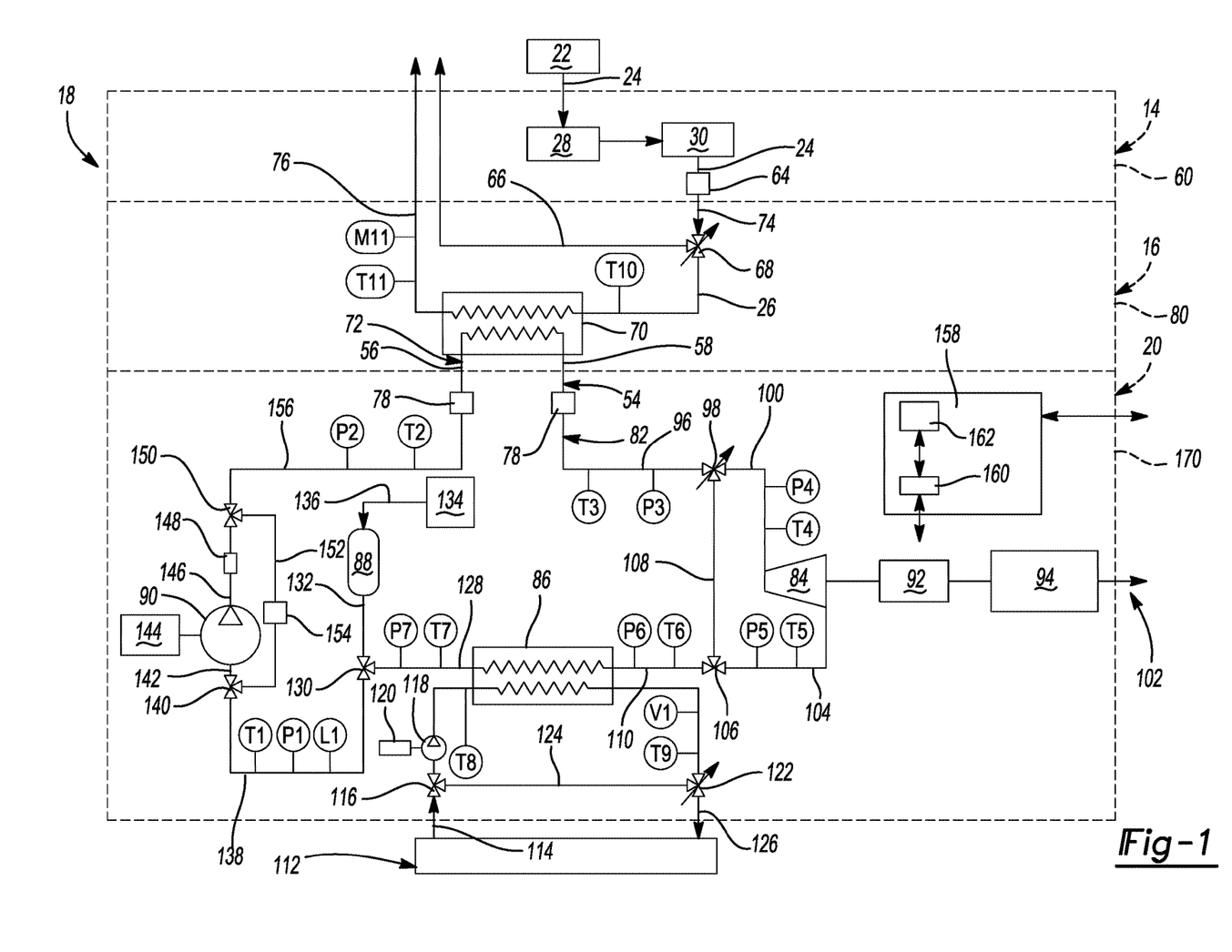
FIG. 1 is a block diagram showing one example power system in accordance with the present disclosure.

FIG. 1 illustrates an example embodiment of a power system 18 in accordance with the present disclosure. The power system 18 is a Rankine power system in that it utilizes the principles of the Rankine thermodynamic cycle to convert heat energy into mechanical energy during the phase change of a working fluid.

As shown in FIG. 1, the power system 18, in one example, includes an aftertreatment assembly 14, an evaporator assembly 16 and a power pack 20. The aftertreatment assembly 14, the evaporator assembly 16 and the power pack 20, as will be further explained below, are separate assemblies that can be easily joined together (and separated for service and/or maintenance) to convert heat from exhaust gases that are generated by an internal combustion engine to mechanical and/or electrical energy.

The power system 18 is an improvement over existing systems in that the aftertreatment assembly 14, the evaporator assembly 16 and the power pack 20 can be added to existing vehicles for the conversion of energy (in the form of heat) to mechanical and/or electrical energy. As will be further explained below, the aftertreatment assembly 14, the evaporator assembly 16 and/or the power pack 20 can be packaged in discrete, separable modular enclosures that can be added to existing vehicles. In addition, one or more of the aftertreatment assembly 14, the evaporator assembly 16 and the power pack 20 can be configured in different arrangements so as to be connected to vehicles that may be equipped with an existing aftertreatment assembly 14. The structure of the aftertreatment assembly 14, the evaporator assembly 16 and the power pack 20 result in a power system 18 that is easily installed, serviced and/or maintained in addition to converting waste heat energy into usable mechanical and/or electrical energy.

Figure 2:
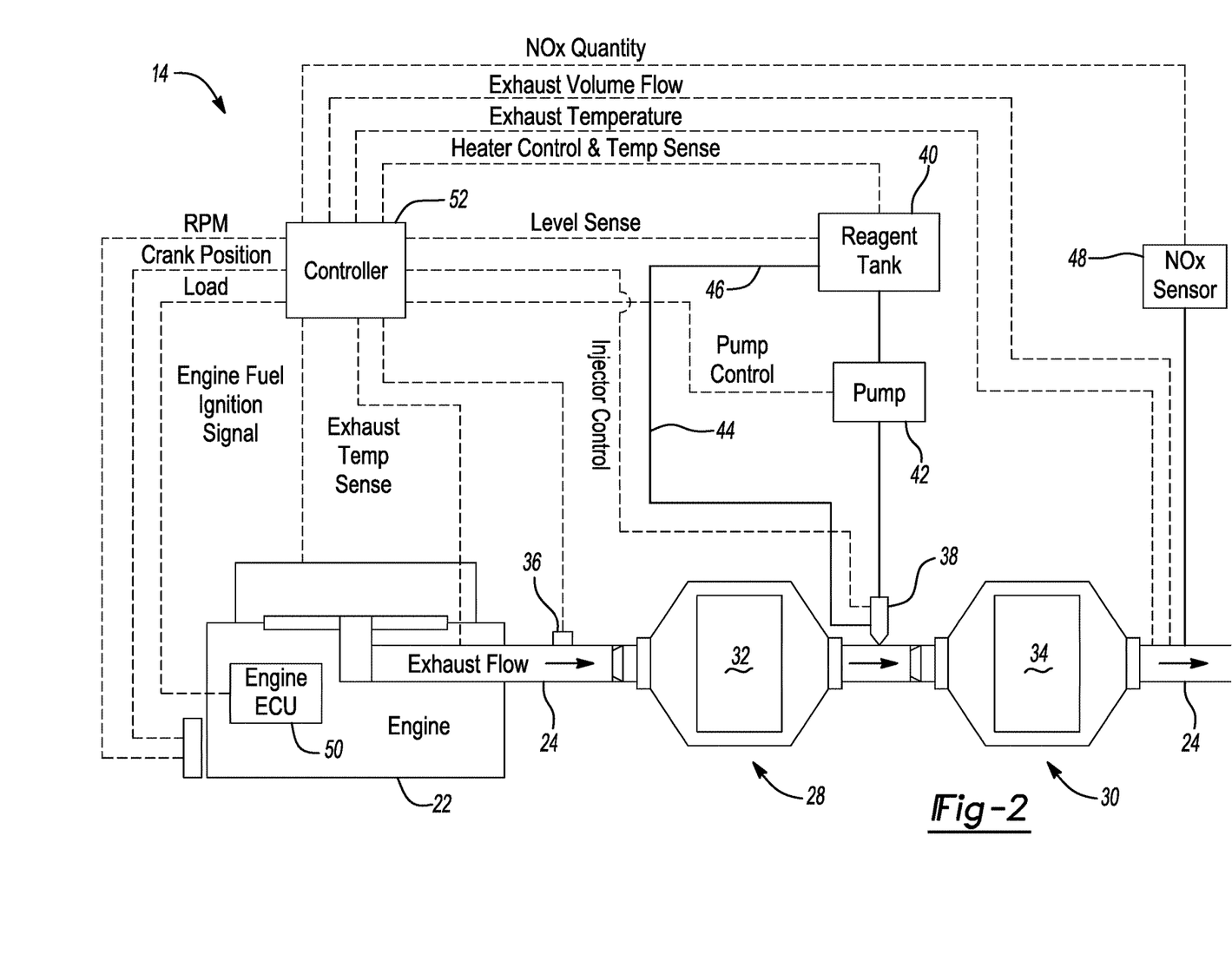
FIG. 2 is a schematic illustration of an example aftertreatment assembly used in the power system of FIG. 1.

Referring now to FIG. 2, the aftertreatment assembly 14 can include one or more devices used to reduce emissions produced by the internal combustion engine. FIG. 2 schematically illustrates an example aftertreatment assembly 14. The aftertreatment assembly 14 is positioned in communication with an internal combustion engine 22 that is in communication with a fuel source (not shown) that, once consumed, will produce exhaust gases that are discharged into an exhaust conduit 24. Downstream from engine 22 can be disposed a pair of exhaust treatment components 28 and 30, which can include catalyst-coated substrates or filters 32 and 34. Catalyst-coated substrates or filters 32 and 34 can be any combination of a diesel particulate filter (DPF), a diesel oxidation catalyst (DOC) component, a selective catalytic reduction (SCR) component, a lean NOX catalyst, an ammonia slip catalyst, a catalyst-coated (e.g., SCR or DOC) DPF, NOX absorber, CO2 capture catalyst, or any other type or combination of exhaust treatment devices known to one skilled in the art.

Although not required by the present disclosure, the aftertreatment assembly 14 can further include components such as a thermal enhancement device or burner 36 to increase a temperature of the exhaust gases passing through exhaust conduit 24. Increasing the temperature of the exhaust gas is favorable to achieve light-off of the catalyst in the exhaust treatment component 28 in cold-weather conditions and upon start-up of engine 22, as well as initiate regeneration of the exhaust treatment component 28 when the exhaust treatment substrate 32 or 34 is a DPF. The thermal enhancement device or burner 36 can also be used to increase the temperature of the exhaust gas to achieve an improvement in the performance and/or efficiency of the power pack 20.

To assist in reduction of the emissions produced by engine 22, the aftertreatment assembly 14 can include a dosing module 38 for periodically dosing an exhaust treatment fluid into the exhaust stream. As illustrated in FIG. 2, the dosing module 38 can be located upstream of exhaust treatment component 28, and is operable to inject an exhaust treatment fluid into the exhaust stream. In this regard, the dosing module 38 is in fluid communication with a reagent tank 40 and a pump 42 by way of inlet line 44 to dose an exhaust treatment fluid such as diesel fuel or urea into the exhaust conduit 24 upstream of exhaust treatment components 28 and 30. Dosing module 38 can also be in communication with reagent tank 40 via return line 46. Return line 46 allows for any exhaust treatment fluid not dosed into the exhaust stream to be returned to reagent tank 40. Flow of the exhaust treatment fluid through inlet line 44, dosing module 38, and return line 46 also assists in cooling dosing module 38 so that dosing module 38 does not overheat. Although not illustrated in the drawings, dosing module 38 can be configured to include a cooling jacket that passes a coolant around dosing module 38 to cool it.

The amount of exhaust treatment fluid required to effectively treat the exhaust stream may vary with load, engine speed, exhaust gas temperature, exhaust gas flow, engine fuel injection timing, desired NOx reduction, barometric pressure, relative humidity, EGR rate and engine coolant temperature. A NOx sensor or meter 48 may be positioned downstream from exhaust treatment component 28. NOx sensor or meter 48 may also be positioned upstream or between the exhaust treatment components 28 and 30. NOx sensor 48 is operable to output a signal indicative of the exhaust NOx content to an engine control unit 50. NOx sensor or meter 48 may also be replaced by a particulate matter sensor. All or some of the engine operating parameters may be supplied from engine control unit 50 via the engine/vehicle databus to a reagent electronic dosing controller 52. The reagent electronic dosing controller 52 could also be included as part of the engine control unit 50. Exhaust gas temperature, exhaust gas flow and exhaust back pressure and other vehicle operating parameters may be measured by respective sensors, as indicated in FIG. 2.

As can be appreciated, not all the illustrated components are required nor may be included in the aftertreatment assembly 14. The type of the engine 22, the size of the vehicle, packaging restraints and other factors may vary the size and internal components of the aftertreatment assembly 14. Referring back to FIG. 1, the aftertreatment assembly 14 can be positioned inside a first housing 60. The first housing 60 may include a support structure (not shown) and a first cover 62 (see FIG. 5, for example). As such and as will be further described below, the packaging of the aftertreatment assembly 14 in the first housing 60 can limit the size and quantity of aftertreatment components that are included in the aftertreatment assembly 14.

As shown in the example of FIG. 1, the aftertreatment assembly 14 includes the exhaust conduit 24 that permits exhaust gases to flow to the exhaust treatment components 28 and 30. After exiting the exhaust treatment components 28 and 30, the exhaust gases can flow to the evaporator assembly 16 through the exhaust conduit 24. The aftertreatment assembly 14 can include an exhaust service connector 64 that fluidly connects the exhaust conduit 24 to an evaporator assembly exhaust line 74. The exhaust service connector 64 may be positioned at any number of positions along the exhaust conduit 24, including at a position inside the evaporator assembly 16 rather than inside the aftertreatment assembly 14 as shown. The exhaust service connector 64 can be any suitable connector that permits an evaporator exhaust inlet 26 to be easily connected (and disconnected) from the exhaust conduit 24 extending from the aftertreatment assembly 14. The exhaust service connector 64 can be a circumferential clamp that encircles the exhaust conduit 24 or the exhaust service connector 64 can include a pair of mating flanged fittings that are joined together using one or more fasteners, for example. The exhaust service connector 64 permits the evaporator assembly 16 to be coupled to the aftertreatment assembly 14 without the need for specialized tools such that the power system 18 can be easily installed, serviced and/or maintained.

The evaporator assembly 16 places the exhaust gases flowing from the exhaust conduit 24 in thermal communication with a working fluid in a working fluid loop 54 inside an evaporator 70. The working fluid loop 54 includes a first portion 72 and a second portion 82. The first portion 72 of the working fluid loop 54 is positioned inside the evaporator assembly 16 and is connected to the second portion 82 that is positioned inside the power pack 20. Together, the first portion 72 and the second portion 82 fluidly connect the various components of the power pack 20 (as will be further described below) in the closed working fluid loop 54.

As shown in FIG. 1, the evaporator assembly 16 can include an exhaust bypass 66, an exhaust bypass valve 68, the evaporator 70, and an exhaust outlet 76. The exhaust bypass 66 is a length of conduit that extends from the bypass valve 68 along a path outside of the evaporator 70 to the atmosphere. The bypass valve 68 is connected to the evaporator assembly exhaust line 74 and operates to selectively divert a portion of the exhaust gases through the exhaust bypass 66 rather than flowing to the evaporator 70 through an evaporator exhaust inlet 26. The bypass valve 68 can be a suitable control valve that is operatively coupled to a power pack control unit 158 (described further below) or to other control modules such as the engine control unit 50 (FIG. 2). The exhaust bypass 66 can be utilized to control operating conditions of the evaporator 70 and/or to control a temperature and/or pressure of the working fluid flowing out of the evaporator 70 at an evaporator outlet 58.

The exhaust gases that are not diverted through the exhaust bypass 66 are routed through the evaporator 70 via the evaporator exhaust inlet 26. The exhaust gases can then exit the evaporator 70 through the exhaust outlet 76 and be emitted to the atmosphere. As can be appreciated, a suitable plenum or other exhaust mixing chamber can be included in the evaporator assembly 16 or downstream of the evaporator assembly 16 to combine the exhaust gases in the exhaust outlet 76 and from the exhaust bypass 66 before or after the exhaust gases exit the evaporator assembly 16 and are emitted to the atmosphere.

As further shown, the evaporator assembly 16 can also include one or more temperature sensors T10, T11 and/or a mass flow sensor M11. In the example shown, the temperature sensor T10 is positioned in the evaporator exhaust inlet 26. The temperature sensor T11 and the mass flow sensor M11 are positioned in the exhaust outlet 76. The temperature sensors T10, T11 and the mass flow sensor M11 can be in communication with the power pack control unit 158 to monitor and/or control the operating parameters of the power system 18.

The working fluid in the working fluid loop 54 flows through the evaporator 70 from an evaporator inlet 56 to the evaporator outlet 58. The evaporator 70 can be any suitable evaporator that places the exhaust gases in thermal communication with the working fluid of the working fluid loop 54. For example, the evaporator 70 can be a suitable fin and tube heat exchanger operable to cause heat transfer between the exhaust gases flowing from the evaporator exhaust inlet 26 to the exhaust outlet 76 and the working fluid flowing from the evaporator inlet 56 to the evaporator outlet 58.

The evaporator assembly 16 is positioned inside a second housing 80. The second housing 80 can include a support structure and a second cover (see FIG. 5, for example). In the example shown in FIG. 1, the evaporator assembly 16 is positioned directly adjacent the aftertreatment assembly 14. As will be described further below, the second housing 80 is sized and configured to mount directly to the aftertreatment assembly 14. As can be appreciated, the second housing 80 can be sized such that when the second housing 80 is mounted to the first housing 60, the exhaust conduit 24 is aligned with the service connector 64 such that the exhaust conduit 24 can be easily connected (or disconnected) during installation, service and/or maintenance.

The power pack 20 is positioned directly adjacent the evaporator assembly 16 on a side of the evaporator assembly 16 opposite to the aftertreatment assembly 14. In this position, the second portion 82 of the working fluid loop 54 can be connected to the first portion 72 of the working fluid loop 54 via two working fluid loop service connectors 78. When connected, the first portion 72 and the second portion 82 of the working fluid loop 54 define a closed loop in which a working fluid can be transmitted between the components of the power pack 20. The service connectors 78 can be any suitable sealing connectors such as so-called "quick" connectors, longitudinal connectors, threaded connectors, compression connectors or the like. The service connectors 78 can enable the second portion 82 of the working fluid loop 54 to be connected to the first portion 72 of the working fluid loop 54 without the need for specialized tools such that the power pack 20 can be connected or disconnected from the evaporator assembly 16 during installation, service or maintenance.

As shown, the power pack 20 may include an expander 84, a condenser 86, a tank (or accumulator) 88 and a pump 90. The second portion 82 of the working fluid loop 54 fluidly connects the aforementioned components of the power pack 20. An evaporator line 96 is fluidly connected to the evaporator outlet 58 by the service connector 78. The evaporator line 96 is also connected to an expander control valve 98. An expander inlet line 100 connects the expander control valve 98 to the expander 84.

Any suitable expander 84, such as a turbine, reciprocal, Wankel or helical expander, can be used. As the working fluid moves through the expander 84, one or more elements of the expander 84 rotates. This rotational movement (or mechanical energy) can then be converted into electrical energy by a generator 92. The generator 92 can be connected to a battery 94. The battery 94 can store the electrical energy produced by the generator 92 and use the electrical energy for subsequent use at the output 102 of the battery 94. In the example shown, the battery 94 is shown as located inside the power pack 20. In other examples the generator 92 can be coupled to a battery 94 that is positioned remote from the power pack 20.

The working fluid loop 54 continues from the expander 84 along the expander outlet line 104 to a condenser mixing valve 106. As shown, the power pack 20 can include an expander bypass 108. The expander bypass fluidly connects the expander control valve 98 to the condenser mixing valve 106. As can be appreciated, the expander control valve 98 can operate to selectively cause all or some of the working fluid to flow through the expander bypass 108 instead of flowing through the expander 84. The volume of working fluid that is diverted through the expander bypass 108 can mix with the volume of working fluid that passed through the expander 84 in the condenser mixing valve 106. The working fluid can then flow from the condenser mixing valve 106 into the condenser 86 in a condenser inlet line 110.

The condenser 86 can be any suitable condenser that permits heat transfer between a coolant in a cooling system 112 and the working fluid passing through the condenser 86. As such, the working fluid in the working fluid loop 54 is in thermal communication with the coolant in the cooling system 112. The cooling system 112 can be a vehicle cooling system that includes a radiator and permits the coolant to flow through and cool the engine 22.

The coolant from the cooling system 112 moves into the power pack 20 through coolant input 114. As shown in FIG. 1, the power pack 20 can include a coolant input mixing valve 116 and a coolant pump 118 coupled to a drive motor 120. The power pack 20 can also include a coolant control valve 122 and a coolant bypass 124. The coolant control valve 122 can selectively divert a portion of the volume of coolant flowing out of the condenser 86 through the coolant outlet 126 through the coolant bypass 124 instead of permitting the coolant to pass out of the power pack 20 and back into the cooling system 112. The coolant pump 118 is coupled to the drive motor 120. The drive motor 120 (or the coolant pump 118) can be in communication with the power pack control unit 158. The power pack control unit 158 can variably control the coolant pump 118 to cause the coolant to flow into the condenser 86 at a predetermined set of operating parameters.

The working fluid loop 54 continues at the condenser outlet line 128 at which the working fluid leaves the condenser 86. The condenser outlet line 128 connects the condenser 86 to the tank mixing valve 130. The tank 88 is connected to the tank mixing valve 130 by the tank connecting line 132. The tank 88 can be any suitable expansion tank or other accumulator. As can be appreciated, the tank 88 can be connected to a pressurized fluid source 134. While the pressurized fluid source 134 is shown inside the power pack 20, in other examples, the pressurized fluid source 134 can be located remotely from the power pack 20 and be coupled to the tank 88 by a pressurized fluid line 136.

The tank mixing valve 130 is also connected to the pump connecting line 138. The pump connecting line 138 connects the tank mixing valve 130 to the pump inlet mixing valve 140. The pump inlet mixing valve 140 is also connected to the pump inlet line 142. The pump inlet line 142 connects the working fluid loop 54 to the pump 42. The pump 42 can be any suitable pump for moving or pressurizing the working fluid in the power pack 20. The pump 42, for example, can be a reciprocating pump, a gear pump, a vane pump or a membrane pump. The pump 42 can be coupled to a pump motor 144. As can be appreciated, the pump motor 144 can be in communication with the power pack control unit 158. The power pack control unit 158 can cause the pump 42 to change the operating parameters (e.g., temperature, pressure, flow rate, etc.) of the power pack 20.

The working fluid leaves the pump 42 through the pump outlet line 146. The pump outlet line 146 can include a filter 148 that can remove contaminants or other particulate matter from the working fluid. The pump outlet line 146 connects the pump 42 to the pump relief mixing valve 150. A relief line 152 with a pressure relief valve 154 is positioned in parallel with the pump 42. As can be appreciated, the pressure relief valve 154 can open to when a predetermined pressure level of the working fluid is reached to prevent damage to the pump 42 or to other components of the power pack 20.

An evaporator inlet line 156 is connected to the pressure relief valve 154 and connects the pump 42 to the evaporator 70. In this manner, the power pack 20 includes a closed loop through which the working fluid can travel to operate the Rankine cycle and convert the waste heat energy of the exhaust gases from the engine 22 into mechanical and/or electrical energy.

As can be appreciated, the working fluid in the previously described working fluid loop 54 has different operating parameters as it travels through the power pack 20. For example, the working fluid has a relatively high temperature in certain portions of the working fluid loop 54 and a relatively low temperature in other portions of the working fluid loop 54. The working fluid also can have a relatively high pressure in some portions of the working fluid loop 54 and a relatively low pressure in other portions of the working fluid loop 54. Under these conditions, the working fluid can undergo phase changes as it travels through the working fluid loop 54 and can operate in the liquid phase in some portions of the working fluid loop 54 and in the vapor phase in other portions of the working fluid loop 54. In the example shown, the working fluid operates as a relatively high pressure liquid when the working fluid exits the pump 42 and moves through the pump outlet line 146 and the evaporator inlet line 156. The working fluid can operate as a relatively low pressure liquid when the working fluid exits the condenser 86 and moves through the condenser outlet line 128, the tank connecting line 132, the pump connecting line 138 and the pump inlet line 142. The working fluid can operate as a relatively high pressure vapor when the working fluid exits the evaporator 70 and moves through the evaporator line 96, the expander inlet line 100 and the expander bypass 108. The working fluid can operate as a relatively low pressure vapor when the working fluid exits the expander 84 and moves through the expander outlet line 104 and the condenser inlet line 110.

As further shown in FIG. 1, the power pack 20 can include one or more sensors positioned in various locations in the working fluid loop 54. The sensors operate to indicate an operating parameter of the working fluid in the working fluid loop 54. As shown, a temperature sensor T1, a pressure sensor P1 and a level (or presence) sensor L1 can be positioned in communication with the pump connecting line 138 and can be operative to indicate a temperature, pressure and presence of the working fluid in the pump connecting line 138. A temperature sensor T2 and a pressure sensor P2 can be positioned in communication with the evaporator inlet line 156 and can be operative to indicate a temperature and pressure of the working fluid in the evaporator inlet line 156. A temperature sensor T3 and a pressure sensor P3 can be positioned in communication with the evaporator line 96 and can be operative to indicate a temperature and pressure of the working fluid in the evaporator inlet line 156. A temperature sensor T4 and a pressure sensor P4 can be positioned in communication with the expander inlet line 100 and can be operative to indicate a temperature and pressure of the working fluid in the expander inlet line 100. A temperature sensor T5 and a pressure sensor P5 can be positioned in communication with the expander outlet line 104 and can be operative to indicate a temperature and pressure of the working fluid in the expander outlet line 104. A temperature sensor T6 and a pressure sensor P6 can be positioned in communication with the condenser inlet line 110 and can be operative to indicate a temperature and pressure of the working fluid in the condenser inlet line 110. A temperature sensor T7 and a pressure sensor P7 can be positioned in communication with the condenser outlet line 128 and can be operative to indicate a temperature and pressure of the working fluid in the condenser outlet line 128. A temperature sensor T8 can be positioned in communication with the coolant input 114 and can be operative to indicate a temperature of the coolant in the coolant input 114. A temperature sensor T9 and a volume flow sensor V1 can be positioned in communication with the coolant outlet 126 and can be operative to indicate a temperature and volumetric flow of the coolant in the coolant outlet 126.

The aforementioned sensors can be any suitable sensors known to one of ordinary skill in the art. The sensors can also be coupled to the power pack control unit 158 via an information bus 160. Such an information bus 160 can collect and transmit information indicative of the temperature, pressure, flow, presence or other information to the power pack control unit 158. The power pack control unit 158 may also be operatively coupled (for example, via wired or wireless communication) with the expander control valve 98, the coolant control valve 122, the drive motor 120, the bypass valve 68, the generator 92, the pressurized fluid source 134 and/or the pump motor 144. In response to receiving information indicative of the operating parameters of the working fluid from the sensors, the power pack control unit 158 can cause working fluid to be diverted by one or more of the control valves, the pressure in the tank 88 to be changed, the coolant pump 118 to be driven in a different manner and/or the pump 90 to be driven in a different manner to change the operating parameters of the working fluid to achieve a predetermined efficiency of the power pack and/or to prevent damage to the power pack 20.

The power pack control unit 158 can be connected to elements that are external to the power pack 20. While not shown in this example, the power pack control unit 158 can be connected to an engine management system (EMS) and/or to a vehicle electronic control unit (VECU). The power pack control unit 158 can be connected to the engine management system of a vehicle. In this manner, the power pack control unit 158 can send and receive signal to and from the engine management system so that the operation of the power system 18 is coordinated with the operation of the vehicle. The power pack control unit 158 can receive data from the engine management system such as the various operating parameters of the engine 22.

The power pack control unit 158 can include a suitable controller 162. In one example, the controller 162 can include a processor and non-transitory memory. The memory can have executable instructions, look-up tables and other suitable data that facilitates the operation of the power system 18. The controller 162 can include or be part of an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

Figure 3:
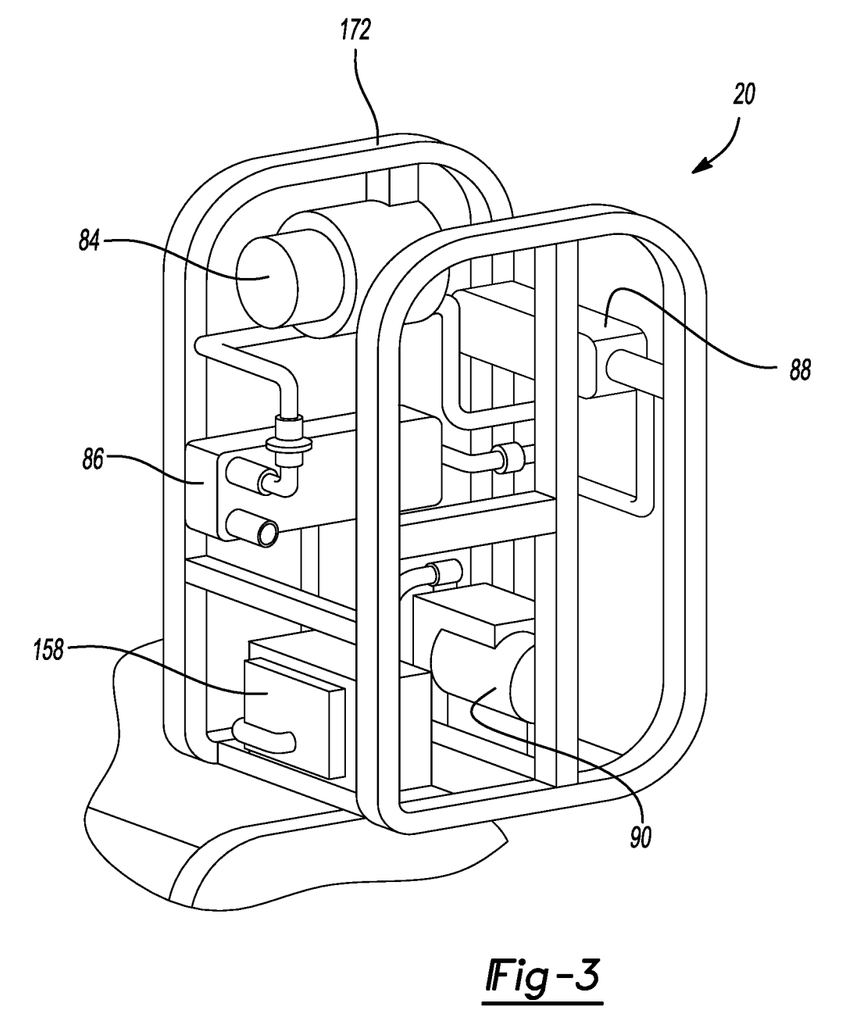
FIG. 3 is an illustration of an example power pack of the system of FIG. 1 shown with its cover removed.

FIG. 3 shows an example power pack 20. As shown, the power pack 20 includes the expander 84, the condenser 86, the power pack control unit 158, the tank 88 and the pump 90. These components are secured to a third housing 170. The third housing 170 can include a support structure 172 that is made of one or more structural members that create a frame around the power pack 20. For example, the support structure 172 can be made of tubular steel members formed into the shape as shown. In other examples, other suitable structural materials can be used. The support structure 172 can additionally include connection points through which fasteners can be used to secure the support structure to a vehicle. In other examples, support brackets (not shown) can project out from the support structure 172 and provide attachment surfaces for the attachment of the power pack 20 to a vehicle.

Figures 4, 5:
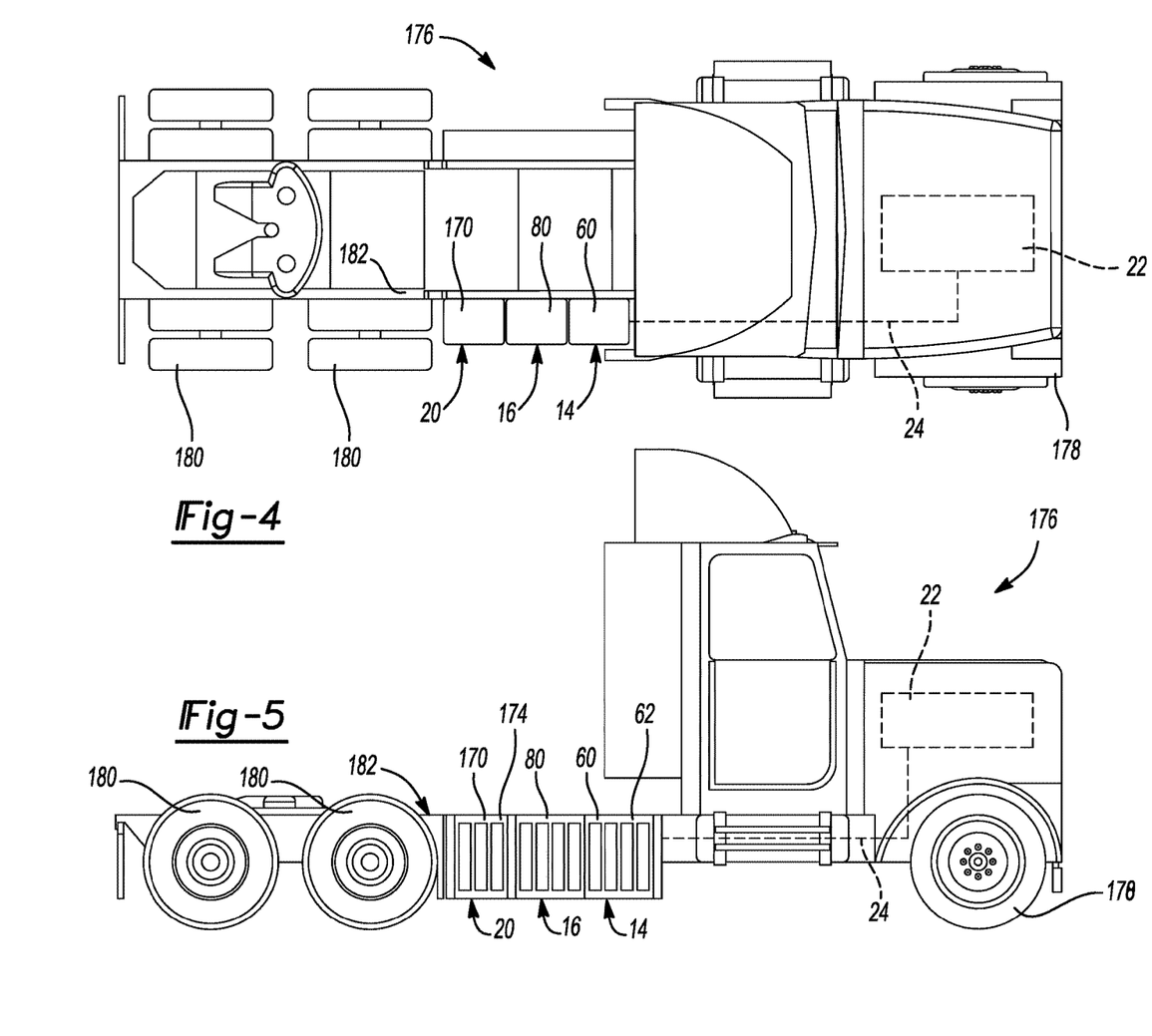
FIG. 4 is a plan view of the example power system of FIG. 1 shown mounted to a vehicle.
FIG. 5 is an elevation view of the vehicle mounted power system of FIG. 4.

As shown in FIG. 5, the power pack 20 can also include a power pack cover member 174. The cover member 174 can be connected to the support structure 172 (FIG. 3) and substantially enclose the power pack 20 on one or more sides of the power pack 20. The cover member 174 can include one or more vents or louvres to permit air to pass through the cover member 174. In the example shown, the cover member 174 is formed of a galvanized sheet metal material. In other examples, other suitable materials such as other metals, alloys, plastic, composites and the like can be used.

As previously stated, the aftertreatment assembly 14 and the evaporator assembly 16 can be positioned inside a first housing 60 and a second housing 80, respectively. The first housing 60 and/or the second housing 80 can have similar constructions to that previously described with respect to third housing 170. In other examples, the first housing 60 and/or the second housing 80 can have different constructions.

In the example shown in FIGS. 4 and 5, the first housing 60, the second housing 80 and the third housing 170 have similar cross-sectional profiles and similar shapes. In this manner, the first housing 60, the second housing 80 and the third housing 170 can be aligned on a vehicle 176 in the manner shown. It can be desirable that the first housing 60, the second housing 80 and the third housing 170 have similar profiles or shapes so that the housings can fit into one location on the vehicle 176. In the example shown, the aftertreatment assembly 14, the evaporator assembly 16 and the power pack 20 are secured to the vehicle 176 longitudinally along a lateral outboard surface of a vehicle frame 182 between a front wheel 178 and a rear wheel 180. Such aligned or localized structure of the power system 18 makes the installation, service and/or maintenance of the power system 18 easier in comparison to systems in which the assemblies and components of other systems are dispersed in different locations in the vehicle.

For purposes of the present disclosure, relative positioning terms may be used to indicate the positioning of one or more elements of the power system 18 of the present disclosure relative to the vehicle 176 and/or relative to each other. Unless otherwise explicitly stated or as otherwise unambiguously indicated by the context, the following terms indicate the following directions. The term "longitudinal" means a direction extending from a front of the vehicle 176 to a rear of the vehicle 176. The term "lateral" means a direction generally perpendicular to the longitudinal direction (i.e., cross-vehicle direction). Directional terms, such as "forward", "backward", "front" and "rear," indicate such a direction relative to the vehicle 176.

Referring back to FIGS. 4 and 5, the aftertreatment assembly 14, the evaporator assembly 16 and the power pack 20 have similar cross-sectional shapes such that the aftertreatment assembly 14, the evaporator assembly 16 and the power pack 20 are aligned to create a compact, modular power system 18 that is easily installed, serviced and maintained. In addition, the appearance of the power system 18, when joined together, is aesthetically pleasing. In the example shown, the first housing 60, the second housing 80 and the third housing 170 have a similar rounded rectangular cross-sectional shape. As such the first housing 60, the second housing 80 and the third housing 170 can have the shape of a rectangular prism. The first housing 60, the second housing 80 and the third housing 170 are aligned such that the longitudinal and lateral faces of the first housing 60, the second housing 80 and the third housing 170 are aligned in a coplanar configuration.

As further shown, the aftertreatment assembly 14, the evaporator assembly 16 and the power pack 20 are positioned longitudinally rearward of the engine 22. The exhaust conduit 24 (not shown in FIG. 5) extends from the engine 22 to the aftertreatment assembly 14. The exhaust conduit 24 can then extend into the evaporator assembly 16 as previously described.

Figure 6:
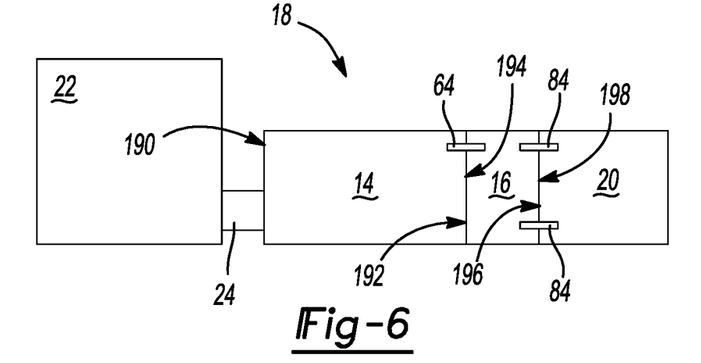
FIG. 6 is a block diagram showing an example configuration of the power system of FIG. 1.

Referring now to FIG. 6, a block diagram of an example configuration of the power system 18 is shown. The configuration shown in FIG. 6 is that previously described and shown as attached to the vehicle 176 in FIGS. 4 and 5. In this example configuration, the aftertreatment assembly 14 is connected longitudinally rearward of the engine 22. The exhaust conduit 24 is connected between the engine 22 and extends into the aftertreatment assembly 14. A forward-facing face 190 of the aftertreatment assembly 14 is positioned at a front of the aftertreatment assembly 14 in a direction facing the engine 22. The evaporator assembly 16 is positioned directly adjacent the aftertreatment assembly 14. In such a configuration, a forward-facing face 192 of the evaporator assembly 16 can be directly adjacent a rear-facing face 194 of the aftertreatment assembly 14. The power pack 20 is positioned directly adjacent the evaporator assembly 16 on a side of the evaporator assembly 16 opposite to the aftertreatment assembly 14. In such a configuration, a forward-facing face 196 of the power pack 20 can be positioned directly adjacent a rear-facing face 198 of the evaporator assembly 16.

As shown in FIG. 6, the power system 18 can include the exhaust service connector 64 and the working fluid service connectors 78 previously described. The one or more service connectors 64, 78 enable the power system 18 to be quickly and easily installed, service and maintained. In the example shown, one exhaust service connector 64 couples the aftertreatment assembly 14 to the evaporator assembly 16 and two working fluid service connectors 78 couple the evaporator assembly 16 to the power pack 20.

Figure 7A:
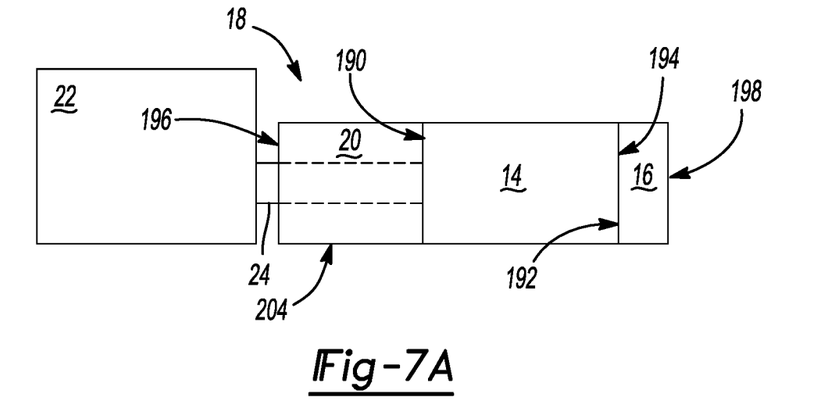
FIG. 7A is a block diagram showing another example configuration of a power system in accordance with the present disclosure.

Referring now to FIG. 7, another configuration of the power system 18 is illustrated. In this example, the first housing 60, the second housing 80 and the third housing 170 are relatively positioned in a different arrangement as may be necessitated by the packaging requirements of the vehicle 176 or if an existing system of the vehicle 176 is equipped with a system having a predefined shape. For example, the vehicle 176 may have a configuration in which the only packaging space available for the power pack 20 is located longitudinally forward of the aftertreatment assembly 14. As shown in FIG. 7, the power pack 20 is positioned longitudinally forward of the aftertreatment assembly 14. The power pack 20, in this example, has a shape that defines a cavity 200. The exhaust conduit 24 can extend through the cavity 200 of the power pack 20 from the engine 22 to the aftertreatment assembly 14. The evaporator assembly 16, in this example, is positioned directly adjacent to the aftertreatment assembly 14 on a side opposite to the power pack 20.

Figure 7B:
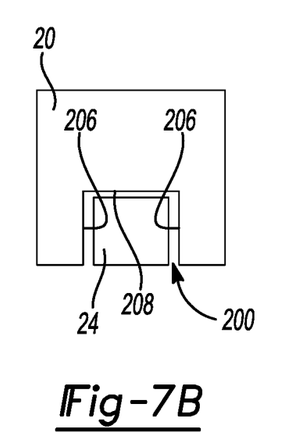
FIG. 7B is a block diagram showing an example cross-sectional configuration of the power pack of the example power system of FIG. 7A.

In this example configuration, the power pack 20 is positioned directly adjacent the aftertreatment assembly 14. A rear-facing face 202 of the power pack 20 is directly adjacent the forward-facing face 190 of the aftertreatment assembly 14. The forward-facing face 192 of the evaporator assembly 16 can be positioned directly adjacent the rear-facing face 194 of the aftertreatment assembly 14. In one variation of this example (as shown in FIG. 7B), the cavity 200 can be positioned adjacent to a ground-facing face 204 of the power pack 20. In such a variation, the cavity 200 is defined by two opposing inner sides 206 of the power pack 20 and an intermediate ground-facing side 208. In this variation, the power pack 20 has an upside-down U-shape with the cavity bordering the ground-facing face 204 of the power pack 20.

Figure 7C:
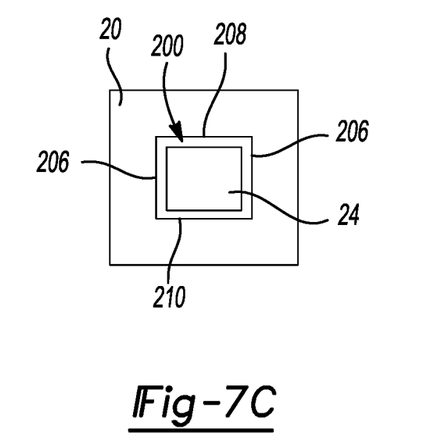
FIG. 7C is a block diagram showing another example cross-sectional configuration of the power pack of the example power system of FIG. 7A.

In another variation of configuration depicted in FIG. 7A, the power pack 20 can have an alternate cross-sectional profile as depicted in FIG. 7C. In this variation, the cavity 200 is surrounded by the power pack 20 such that the cavity 200 does not border one of the outer faces of the power pack 20. In this variation, the cavity 200 is defined by the two opposing inner sides 206 and by a ground-facing side 208 and an upward-facing side 210. The power pack 20, in this variation, has an O-shaped cross-sectional profile with the cavity 200 centrally located therein.

In the variations depicted in FIGS. 7B and 7C, one or more of components of the power pack 20 can be positioned around the exhaust conduit 24 to define the cavity 200. For example, the second portion 82 of the working fluid loop 54 can extend around the exhaust conduit 24. In such configurations, one or more of the working fluid loop 54, the tank, the condenser, the pump and the expander can define the cavity 200. In the variation shown in FIG. 7B, the components of the power pack 20 can be positioned on at three sides of the exhaust conduit 24. In the variation depicted in FIG. 7C, the components of the power pack 20 can be positioned on four sides of the exhaust conduit 24. As shown in block diagrams, components are depicted with rectangular or square profiles. As can be appreciated, such elements can have round, oval or other profile shapes.

Figure 8A:
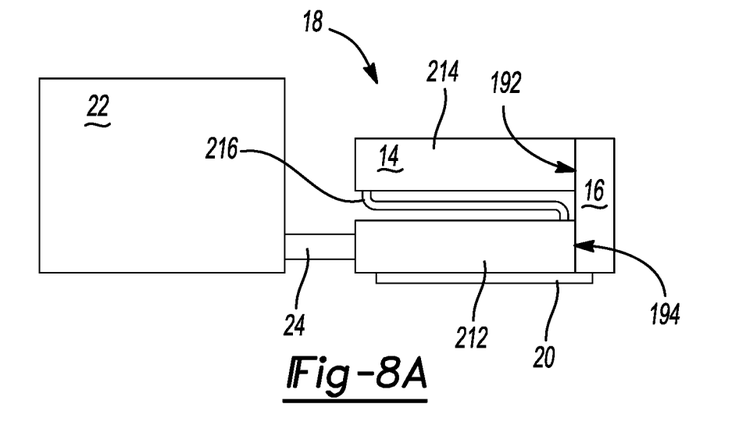
FIG. 8A is a block diagram showing another example configuration of a power system in accordance with the present disclosure.
Figure 8B:
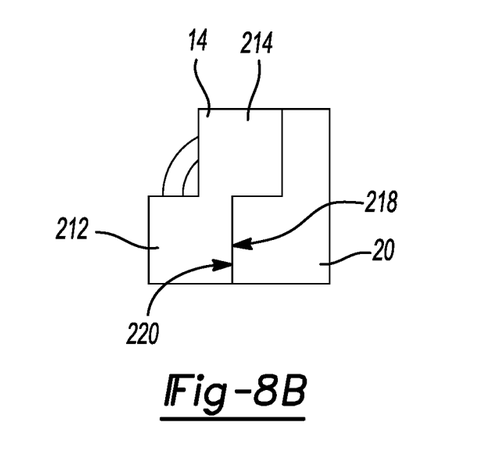
FIG. 8B is a block diagram showing an example cross-sectional configuration of the power pack of the example power system of FIG. 8A.
Figure 8C:
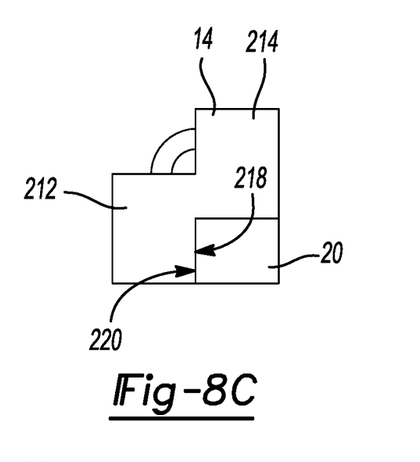
FIG. 8C is a block diagram showing another example cross-sectional configuration of the power pack of the example power system of FIG. 8A.

In another configuration of the power system 18, the aftertreatment assembly 14 and the power pack 20 can be longitudinally aligned such that at least a portion of the power pack 20 longitudinally overlaps a portion of the aftertreatment system 14 as shown in FIG. 8A. In this configuration, the aftertreatment assembly 14 includes a first section 212 and a second section 214. The first section 212 is positioned at a vertical position in alignment with the exhaust conduit 24. The first section 212 is fluidly connected to the second section 214 via an exhaust line 216. The second section 214 is positioned above the first section 212. As shown in the cross-sectional views 8B and 8C, the first section 212 can be laterally offset from the second section 214. In these variations, the second section 214 is positioned laterally outboard of the first section 212.

As further shown in FIGS. 8A-C, the evaporator assembly 16 can be positioned directly adjacent the aftertreatment assembly 14 opposite the engine 22. The forward-facing face 192 of the evaporator assembly can be positioned directly adjacent a rear-facing face 194 of the aftertreatment assembly 14. The power pack 20 is positioned directly adjacent the aftertreatment assembly 14 and longitudinally aligned therewith. In this configuration an inboard side face 220 of the power pack 20 is positioned directly adjacent an outboard side face 218 of the first section 212 of the aftertreatment assembly 14. As shown, a portion of the power pack 20 is nested below the aftertreatment assembly 14 as well as positioned laterally adjacent the aftertreatment assembly 14.

Figure 9:
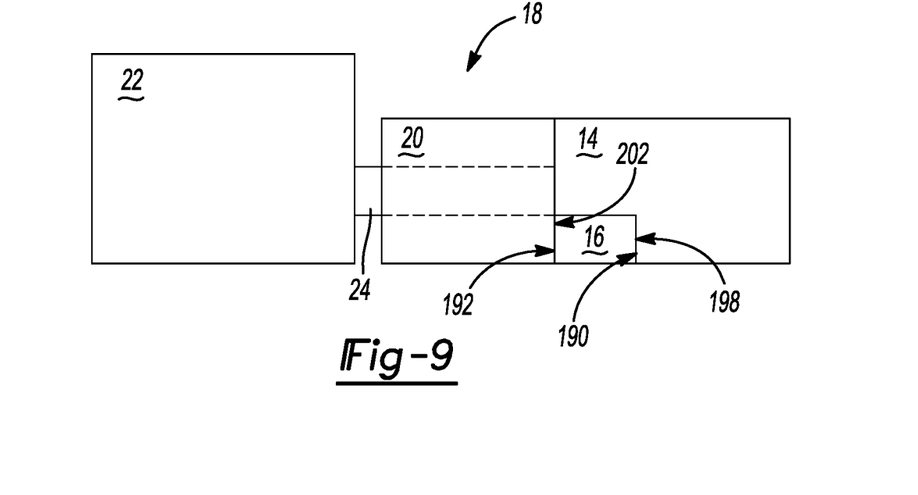
FIG. 9 is a block diagram showing another example configuration of a power system in accordance with the present disclosure.

Another example configuration of the power system 18 is shown in FIG. 9. In this configuration, the power pack 20 is positioned forward of the aftertreatment assembly 14 as previously described with respect to the configuration shown in FIG. 7A. In this configuration, however, the evaporator assembly 16 is positioned below a portion of the aftertreatment assembly 14 such that the evaporator assembly 16 is positioned directly adjacent to both the aftertreatment assembly 14 and the power pack 20. In this example, the forward-facing face 192 of the evaporator assembly 16 is positioned directly adjacent the rear-facing face 202 of the power pack 20. The rear-facing face 198 of the evaporator assembly 16 is positioned directly adjacent a portion of the forward-facing face 190 of the aftertreatment assembly 14. The power pack 20 of the configuration shown in FIG. 9 can have cross-sectional profiles similar to that shown in FIGS. 7B and 7C.

The configurations of the power system 18 (and variations thereof) described above should not be considered as limiting in nature. Further alterations and combinations of the configurations and arrangements of the aftertreatment assembly 14, the evaporator assembly 16 and the power pack 20 can also be used. The particular environment and the packaging, functional and structural limitations of the environment in which the power system 18 is used can drive further changes to the configurations described above.

Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

What is claimed is:

1. A power system for converting waste heat from exhaust gases of an internal combustion engine to electrical energy, the power system comprising:
   an aftertreatment assembly comprising an exhaust conduit operable to receive exhaust gases from the internal combustion engine;
   an evaporator assembly positioned adjacent the aftertreatment assembly, the evaporator assembly comprising a first portion of a working fluid loop, the first portion of the working fluid loop in thermal communication with a portion of the exhaust conduit that extends from the aftertreatment assembly into the evaporator assembly; and
   a power pack positioned adjacent the aftertreatment assembly, the power pack comprising a tank, a condenser, a pump and an expander fluidly connected by a second portion of the working fluid loop, the second portion fluidly connected to the first portion of the working fluid loop, the power pack defining a cavity through which the exhaust conduit extends from the engine to the aftertreatment assembly.

2. The power system of claim 1, wherein relative positioning of one or more of the working fluid loop, the tank, the condenser, the pump and the expander defines the cavity through which the exhaust conduit extends from the engine to the aftertreatment assembly.

3. The power system of claim 1, wherein:
the aftertreatment assembly includes a first housing having an upstream face and a downstream face; and
the power pack is positioned adjacent the upstream face and the evaporator assembly is positioned adjacent the downstream face.

4. The power system of claim 1, wherein the cavity is positioned in a center region of the power pack such that the working fluid loop is positioned on at least two opposing sides of the exhaust conduit.

5. The power system of claim 1, wherein the cavity borders a ground-facing side of the power pack such that the working fluid loop is positioned on three sides of the exhaust conduit.

6. The power system of claim 1, wherein the power pack is positioned around the exhaust conduit between the aftertreatment assembly and the engine.

7. The power system of claim 1, wherein:
the power pack is positioned between the engine and the aftertreatment assembly, the power pack having a forward-facing face and a rear-facing face, the forward-facing face facing the engine; and
the aftertreatment assembly and the evaporator assembly are both positioned directly adjacent portions of the rear-facing face.

8. The power system of claim 1, wherein the evaporator assembly is positioned directly adjacent a rear-facing face of the aftertreatment assembly.

9. A power system for converting waste heat from exhaust gases of an internal combustion engine to electrical energy, the power system comprising:
an aftertreatment assembly positioned within a first housing, the aftertreatment assembly comprising an exhaust conduit operable to receive exhaust gases from the internal combustion engine;
an evaporator assembly positioned within a second housing, the evaporator assembly positioned directly adjacent the aftertreatment assembly, the evaporator assembly comprising a first portion of a working fluid loop, the first portion of the working fluid loop in thermal communication with a first length of the exhaust conduit that extends from the aftertreatment assembly into the second housing; and
a power pack positioned longitudinally forward of and directly adjacent to the aftertreatment assembly, the power pack comprising a tank, a condenser, a pump and an expander fluidly connected by a second portion of the working fluid loop, the second portion fluidly connected to the first portion of the working fluid loop.

10. The power system of claim 9, wherein the power system is configured to connect to a vehicle that is operable to move in a forward direction of travel, the aftertreatment assembly, the evaporator assembly and the power pack positioned directly adjacent one another in a direction parallel to the forward direction of travel.

11. The power system of claim 9, wherein the aftertreatment assembly, the evaporator assembly and the power pack are aligned in a longitudinal direction of a vehicle.

12. The power system of claim 9, wherein the evaporator assembly is positioned directly adjacent to the aftertreatment assembly on a side opposite to the power pack.

13. The power system of claim 9, wherein the exhaust conduit extends through the power pack.

14. The power system of claim 9, wherein:
the power pack is positioned between the engine and the aftertreatment assembly, the power pack having a forward-facing face and a rear-facing face, the forward-facing face facing the engine; and
the aftertreatment assembly and the evaporator assembly are both positioned directly adjacent portions of the rear-facing face.

15. The power system of claim 9, wherein the evaporator assembly is positioned directly adjacent a rear-facing face of the aftertreatment assembly.

* * * * *